United States Patent [19]

Adolph

[11] 4,374,241

[45] Feb. 15, 1983

[54] NITROPOLYFORMALS

[75] Inventor: Horst G. Adolph, Silver Spring, Md.

[73] Assignee: The United States of America as represented by the Secretary of the Navy, Washington, D.C.

[21] Appl. No.: 343,810

[22] Filed: Jan. 29, 1982

[51] Int. Cl.$^3$ .............................................. C08G 12/04
[52] U.S. Cl. ................................... 528/266; 528/232; 528/242; 528/269; 568/590
[58] Field of Search ............... 528/232, 242, 266, 269; 568/590

[56] References Cited

U.S. PATENT DOCUMENTS

| | | | |
|---|---|---|---|
| 3,288,863 | 11/1966 | Hall et al. ........................... | 568/590 |
| 3,531,534 | 9/1970 | Adolph ................................ | 568/589 |
| 3,705,197 | 12/1972 | Kaplan et al. ...................... | 568/590 |
| 3,745,076 | 7/1973 | Sickman et al. .................... | 149/19.5 |
| 3,878,004 | 4/1975 | Kamlet ................................. | 149/88 |

OTHER PUBLICATIONS

Journ. of Organic Chemistry, vol. 27, pp. 3598, 3600–3602.

*Primary Examiner*—Lucille M. Phynes
*Attorney, Agent, or Firm*—R. F. Beers; K. E. Walden; R. D. Johnson

[57] ABSTRACT

Nitropolyformals of the formula $H+OCH_2C(NO_2)_2ZC(NO_2)_2CH_2OCH_2+OCH_2C(NO_2)_2ZC(NO_2)_2CH_2$ OH wherein Z is —$CH_2$—, —$CH_2CH_2$—, —$CH_2CH_2CH_2$—, —$CH_2OCH_2$—, or —$CH_2NHCH_2$— and wherein the average molecular weight of the nitropolyformal molecules is from about 1,000 to about 50,000. The nitropolyformals are prepared by reacting a diol of the formula $HOCH_2C(NO_2)_2ZC(NO_2)_2CH_2OH$, wherein Z is defined as above, with formaldehyde in the presence of concentrated sulfuric acid. These polymers are useful as energetic binders in explosives and propellants.

7 Claims, No Drawings

NITROPOLYFORMALS

BACKGROUND OF THE INVENTION

Previous energetic nitropolymers derived from nitrodiols have used primarily 2,2,8,8-tetranitro-4,6-dioxanonane-diol (DINOL) having the formula $CH_2(OH)C(NO_2)_2CH_2OCH_2OCH_2C(NO_2)_2CH_2OH$, as the nitrodiol component. For instance, U.S. Pat. No. 3,745,076 discloses the reaction of 4,4-dinitropimeloyl with DINOL to form a polymer. U.S. Pat. No. 3,288,863 discloses the reaction of toluene diisocyanate with DINOL to form a rubbery, explosive polyurethane. DINOL has several drawbacks as a component for nitropolymers: it is cleaved readily at the central C—O bonds and tends to form 6- or 12-membered ring structures rather than or in addition to polymers in several polymer forming reactions, especially those expected to lead to polyformals.

SUMMARY OF THE INVENTION

Accordingly, an object of this invention is to provide novel nitropolyformals.

Another object of this invention is to provide a method of making novel nitropolyformals.

A further object of this invention is to provide nitropolyformals having greater stability than those made from DINOL.

Yet another object of this invention is to reduce or prevent side reactions — such as cyclization — in the preparation of nitropolyformals.

These and other objects of this invention are achieved by providing a nitropolyformal of the formula

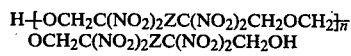
$OCH_2C(NO_2)_2ZC(NO_2)_2CH_2OH$ wherein Z is $-CH_2-$, $-CH_2CH_2-$, $-C_2CH_2CH_2-$, $-CH_2OCH_2-$, or $-CH_2NHCH_2-$, and wherein the average molecular weight of the molecules of the polymer is from about 1,000 to about 50,000. The polymer is prepared by reacting a diol of the formula $HOCH_2C(NO_2)_2ZC(NO_2)_2CH_2OH$, wherein Z is as defined above, with formaldehyde in the presence of a strong acid such as concentrate sulfuric acid.

DETAILED DESCRIPTION OF THE PREFERRED EMBODIMENT

A diol of the formula $HOCH_2C(NO_2)_2ZC(NO_2)_2C-H_2OH$ is polymerized with formaldehyde to form a nitropolyformal - of the general formula

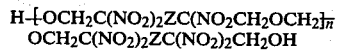
$OCH_2C(NO_2)_2ZC(NO_2)_2CH_2OH$ wherein Z is $-CH_2-$, $-CH_2CH_2-$, $-CH_2CH_2C-H_2-$, $-CH_2OCH_2-$, or $-CH_2NHCH_2-$, and wherein the average weight of the nitropolyformal is from about 1,000 to about 50,000. Thus, the diols which may be used include:
$HOCH_2C(NO_2)_2CH_2C(NO_2)_2CH_2OH$,
$HOCH_2C(NO_2)_2CH_2CH_2C(NO_2)_2CH_2OH$,
$HOCH_2C(NO_2)_2CH_2CH_2CH_2C(NO_2)_2CH_2OH$,
$HOCH_2C(NO_2)_2CH_2OCH_2C(NO_2)_2CH_2OH$, and
$HOCH_2C(NO_2)_2CH_2NHCH_2C(NO_2)_2CH_2OH$.
and the energetic nitropolyformals which will be produced from these diols include:

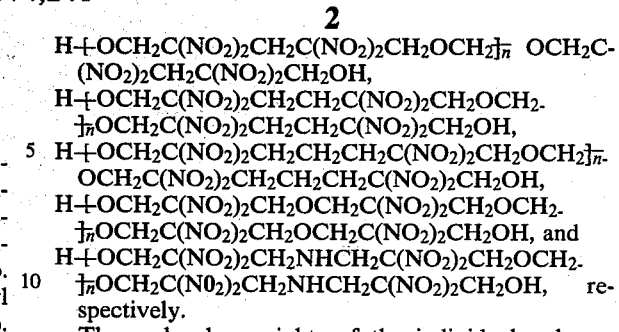

respectively.

The molecular weights of the individual polymer molecules of a given nitropolyformal will vary with the structure of the diol and the ratio of diol to formaldehyde. As a result, no specific value can be given for n. Instead the average molecular weight of the nitropolyformal molecules is used. The average molecular weight is from about 1,000 to about 50,000, but preferably from 1,500 to 4,000.

The equivalent ratio of paraformaldehyde (i.e., formaldehyde) to diol is chosen between 0.8:1 and 1:1, but is preferably about 0.95:1.

Concentrated sulfuric acid works well as both the catalyst and solvent. Other acids having strengths comparable to that of concentrated sulfuric would also probably work. However, because of the complexity of the reaction mechanism, actual testing will be necessary to determine which acids will work. In any case, because of its effectiveness, availability, and inexpensiveness, concentrated sulfuric acid is preferred.

The reaction temperature is not a critical factor; ambient temperature works well and is convenient.

Examples 2 and 3 illustrate methods of isolating the product homopolymers from the reaction mixture.

The general nature of the invention having been set forth, the following examples are presented as specific illustrations thereof. It will be understood that the invention is not limited to these examples, but is susceptible to various modifications that will be recognized by one of ordinary skill in the arts.

Example 1 is incorporated verbatim from an article entitled, "Synthesis of α, α, ω, ω,-tetranitroalkanes,"by Henry Feuer et al, Journal of Organic Chemistry, volume 27 (1962), pp 3598+, at page 3601. It provides a method of preparing 2,2,5,5-tetranitro-1,6-hexanediol which is the monomer used in the preparation of the polymer of Example 2.

EXAMPLE 1 (prior art)

2,2,5,5-tetranitro-1,6-hexanediol

1,4-Dinitrobutane (80.6 g, 0.545 mole) was added to a solution of sodium hydroxide (45 g, 1.10 moles, 98% assay) in 275 ml of water and the mixture stirred for 2 hours at 0° C. Formalin (82 ml., 32.6 of formaldehyde, 1.09 moles) was added all at once causing the temperature to rise to 16°. After stirring the solution at 3° for 2 hours, 78 g (1.12 moles, 98.6% assay) of sodium nitrite was added; then a solution of 380 g (2.24 moles) of silver nitrate in 440 ml of water was added all at once and the mixture stirred vigorously at 0° for 1 hour. Filtering the precipitate, drying in vacuo and continuous extraction in a Soxhlet apparatus with 640 ml of dry ether for 20 hours gave, after evaporating the solvent, 91 g (56%) of crude 2,2,5,5-tetranitro-1,6-hexanediol-(IX), m.p. 115°–123°. Recrystallizing a 15-g aliquot of crude (IX) with 150 ml of hot water containing a drop of concentrated hydrochloric acid gave 11.5 g (equivalent to 43% yield) of pure IX, m.p. 126°–127°.

Anal. Calcd. for $C_6H_{10}O_{10}N_4$: C, 24.17; H, 3.38; N, 18.79. Found: C, 23.97; H, 3.29; N, 18.85.

EXAMPLE 2

Polyformal of 2,2,5,5-tetranitrohexanediol-1,6

1.0 g of 2,2,5,5-tetranitrohexanediol-1,6, prepared according to the procedure of example 1, was added with stirring at room temperature to a solution of 0.1 g of paraformaldehyde in 6 ml 90% sulfuric acid. The mixture was stirred 4 h and then poured over crushed ice. The insoluble material was collected on a Buchner funnel and washed with methylene chloride. The product weighed 0.7 g after drying in air and was completely soluble in tetrahydrofuran and insoluble in water and methylene chloride; melting range 120°–140° C. GPC analysis showed that a mixture of relatively low molecular weight polymers were present in this sample. The absence of starting material and tetranitrodioxacyclononane is demonstrated by the solubility properties of the product.

EXAMPLE 3

Polyformal of 2,2,6,6-tetranitro-4-oxaheptanediol-1,7

2,2,6,6-tetranitro-4-oxaheptanediol-1,7 was prepared by the method disclosed in U.S. Pat. No. 3,531,534 entitled, "Bisfluorodinitroethers and Their Preparation," which issued to Horst G. Adolph on Sept. 29, 1970, herein incorporated by reference. In particular column 2, line 59 through column 3, line 10 and also column 3, lines 31 through 72 are relevant.

The 2,2,6,6-tetranitro-4-oxaheptanediol-1,7 product was purified as follows: The reaction mixture obtained from the Shechter-Kaplan oxidative nitration was filtered with suction and the filter cake washed with a small amount of cold water. The aqueous filtrate was extracted once with ether (75 ml for a reaction starting with 6 g 2,2'-dinitrodiethyl ether). The extract was freed from solvent and heated 0.5 h with excess acetyl chloride. The mixture of acetates obtained was separated by chromatography on silica (methylene chloride/hexane 4:1). The initial fractions were the diacetate of the tetranitroheptanediol of good purity as indicated by NMR analysis ($CDCL_2$): δ2.04 ($CH_3$-CO); 4.44 (AcO$CH_2$); 4.86 (C-$CH_2$-C). The free diol was generated from the diacetate by dissolving the latter in excess conc. sulfuric acid and, after 15 minutes pouring over crushed ice and extracting with ether. Removal of the solvent and removal of acetic acid as an azeotrope with 1,2-dichloroethane afforded 2,2,6,6-tetranitro-4-oxaheptanediol-1,6 of good purity.

The purified 2,2,6,6-tetranitro-4-oxaheptanediol-1,7, 0.4 g, was mixed with 5 ml methylene chloride, a solution of one equivalent of paraformaldehyde in 2 ml 90% sulfuric acid was added, and the mixture stirred 3 h at ambient temperature. The mixture was poured over crushed ice and the solid precipitate recovered by filtration. The solid was insoluble in methylene chloride and ether, and was soluble in tetrahydrofuran; it melted gradually above 150° C. with darkening and decomposition. The IR spectrum indicates the presence of nitrogroups. The solubility properties identify this material as the desired oligo- or polyformal.

Obviously, many modifications and variations of the present invention are possible in the light of the above teachings. It is therefore to be understood that within the scope of the appended claims the inventions may be practiced otherwise than as specifically described.

What is claimed and desired to be secured by Letters Patent of the United States is:

1. A nitropolyformal of the formula

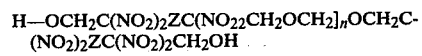

wherein Z is selected from the group consisting of —$CH_2$—, —$CH_2CH_2$, —$CH_2CH_2CH_2$—, —$CH_2OCH_2$—, and —$CH_2NHCH_2$—and wherein the average molecular weight of the homopolymer molecules is from about 1,000 to about 50,000.

2. The nitropolyformal of claim 1 having the formula

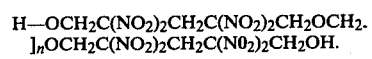

3. The nitropolyformal of claim 1 having the formula

4. The nitropolyformal of claim 1 having the formula

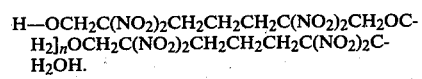

5. The nitropolyformal of claim 1 having the formula

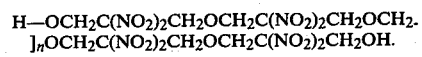

6. The nitropolyformal of claim 1 having the formula

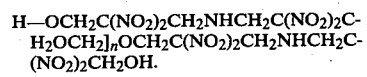

7. The nitropolyformal of claim 1, 2, 3, 4, 5, or 6 wherein the average molecular weight of the homopolymer molecules is from 1,500 to 4,000.

* * * * *